United States Patent
Kanno et al.

(10) Patent No.: US 9,014,959 B2
(45) Date of Patent: Apr. 21, 2015

(54) ENERGY CONSUMPTION CALCULATION DEVICE, AND ENERGY CONSUMPTION CALCULATION METHOD OF SAME

(75) Inventors: Hideyuki Kanno, Atsugi (JP); Mika Sugimoto, Yokohama (JP); Shinya Tagawa, Saitama (JP); Keisuke Mutou, Tokyo (JP)

(73) Assignees: Clarion Co., Ltd., Saitama-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/124,994

(22) PCT Filed: Jun. 5, 2012

(86) PCT No.: PCT/JP2012/064454
§ 371 (c)(1),
(2), (4) Date: Jan. 30, 2014

(87) PCT Pub. No.: WO2012/169490
PCT Pub. Date: Dec. 13, 2012

(65) Prior Publication Data
US 2014/0207363 A1 Jul. 24, 2014

(30) Foreign Application Priority Data

Jun. 10, 2011 (JP) .................. 2011-130324

(51) Int. Cl.
*G01C 21/34* (2006.01)
*B60L 15/20* (2006.01)

(52) U.S. Cl.
CPC ......... *G01C 21/3469* (2013.01); *B60L 15/2045* (2013.01); *B60L 2240/622* (2013.01); *Y02T 90/16* (2013.01); *Y02T 90/161* (2013.01); *Y02T 90/162* (2013.01)

(58) Field of Classification Search
USPC ................................. 701/123, 532
See application file for complete search history.

(56) References Cited

U.S. PATENT DOCUMENTS

2010/0114473 A1  5/2010  Kono et al.
2010/0299057 A1*  11/2010  Osafune ..................... 701/200

FOREIGN PATENT DOCUMENTS

JP  2002-296040 A  10/2002
JP  2004-251786 A  9/2004

(Continued)

OTHER PUBLICATIONS

International Search Report dated Sep. 4, 2012 with English translation (five (5) pages).

*Primary Examiner* — Mary Cheung
*Assistant Examiner* — Yuen Wong
(74) *Attorney, Agent, or Firm* — Crowell & Moring LLP

(57) ABSTRACT

An energy-consumption calculation device includes an energy-consumption estimation unit to estimate energy consumption in a predetermined section; an actual energy consumption identification unit to identify an actual energy consumption supplied in the predetermined section by an energy-supply unit; an energy-consumption correction unit to correct the energy consumption in the predetermined section estimated by the energy consumption estimation unit in accordance with a difference between the energy consumption in the predetermined section estimated by the energy consumption estimation unit and the actual energy consumption in the predetermined section identified by the actual energy consumption identification means; and display unit adapted to identify and display, by using the energy consumption in the predetermined section corrected by the energy consumption correction means, a possible travel range by which travel is possible with a suppliable energy amount of the energy supply unit.

9 Claims, 15 Drawing Sheets

(56) References Cited

FOREIGN PATENT DOCUMENTS

| | | | |
|---|---|---|---|
| JP | 2008-309544 A | 12/2008 | |
| JP | 2009-31046 A | 2/2009 | |
| JP | 2010-107459 A | 5/2010 | |
| JP | 2010-271205 A | 12/2010 | |

* cited by examiner

LINK TABLE 200

Fig.3

VEHICLE INFORMATION TABLE 300

| |  |
|---|---|
| VEHICLE WEIGHT(W) | 301 |
| COEFFICIENT OF DRAG(Cd) | 302 |
| VEHICLE FRONTAL PROJECTED AREA(S) | 303 |
| BASIC POWER CONSUMPTION(Eeloss) | 304 |
| TRAVEL ENERGY CONVERSION EFFICIENCY($\beta$) | 305 |
| POWER REGENERATION EFFICIENCY($\gamma$) | 306 |

Fig.4

PHYSICAL INFORMATION TABLE 400

| GRAVITATIONAL ACCELERATION(g) | 401 |
|---|---|
| AIR DENSITY(ρ) | 402 |

TRAVEL HISTORY TABLE 500

Fig.8
(a)
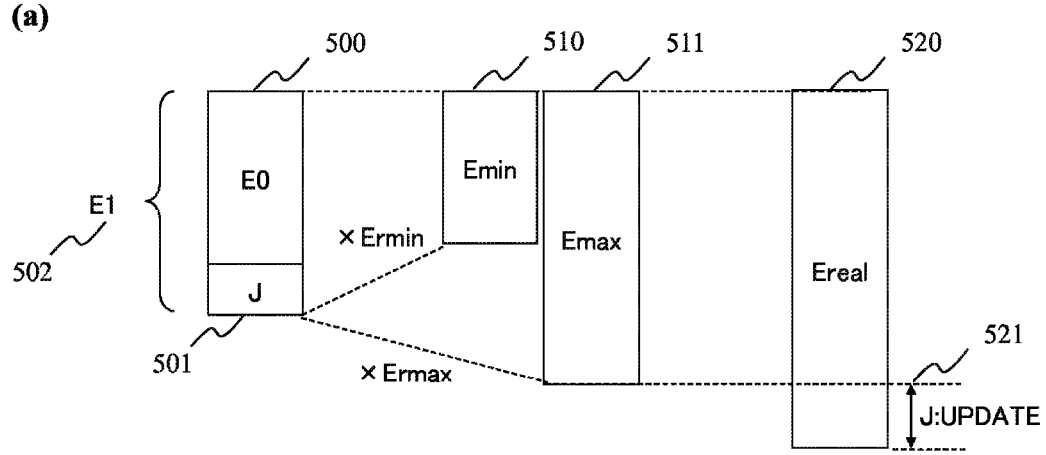
(b)
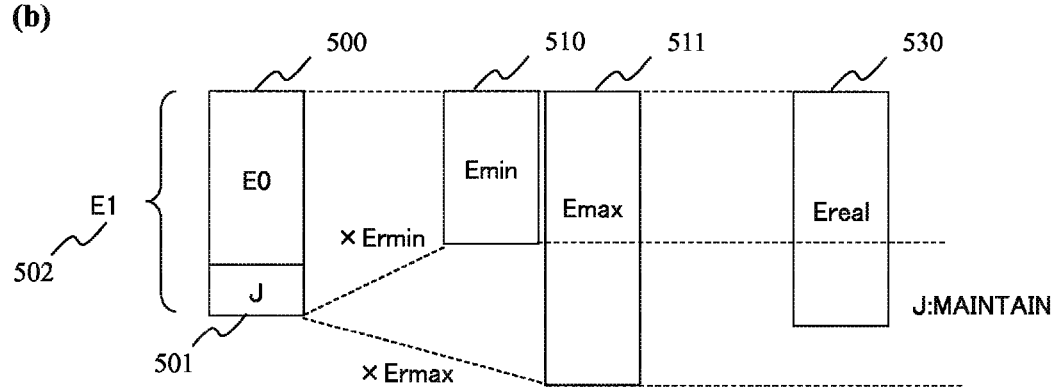

LINK TABLE 200'

ENERGY CONSUMPTION CALCULATION DEVICE, AND ENERGY CONSUMPTION CALCULATION METHOD OF SAME

TECHNICAL FIELD

The present invention relates to a technology for an energy consumption calculation device. The present invention claims priority to Japanese Patent Application No. 2011-130324 filed on Jun. 10, 2011, the contents of which are incorporated by reference herein in designated countries where the incorporation by reference of publications is approved.

BACKGROUND ART

Conventionally, a technology of estimating and displaying energy to be consumed is used in a navigation device. Patent Literature 1 describes a technology for such a navigation device.

CITATION LIST

Patent Literature

[PTL 1] Japanese Patent Laid-open Publication No. 2010-107459

SUMMARY OF INVENTION

Technical Problem

In the above-mentioned navigation device, the energy consumption is estimated by means of the energy conservation law, but there is a limit to modeling of all energy estimation factors such as an influence of unexpected wind and a road condition in advance, and hence a certain error is included in the estimated value. However, the error is not always a negligible error, and estimation accuracy may vary. Thus, in a display of a possible travel range and the like, a difference may occur between a predicted range and an actual possible travel range.

It is therefore an object of the present invention to provide a technology of realizing more accurate estimation of the energy consumption with a simpler method.

Solution to Problem

In order to solve the above-mentioned problem, an energy consumption calculation device according to the present invention includes: energy consumption estimation means for estimating an energy consumption in a predetermined section; actual energy consumption identification means for identifying an actual energy consumption that is actually supplied in the predetermined section by energy supply means for supplying energy; and energy consumption correction means for correcting the energy consumption in the predetermined section estimated by the energy consumption estimation means in accordance with a difference between the energy consumption in the predetermined section estimated by the energy consumption estimation means and the actual energy consumption in the predetermined section identified by the actual energy consumption identification means.

Further, an energy consumption calculation method for use in an energy consumption calculation device according to the present invention includes: an energy consumption estimation step of estimating, by the energy consumption calculation device, an energy consumption in a predetermined section; an actual energy consumption identification step of identifying, by the energy consumption calculation device, an actual energy consumption that is actually supplied in the predetermined section by energy supply means for supplying energy; and an energy consumption correction step of correcting, by the energy consumption calculation device, the energy consumption in the predetermined section estimated in the energy consumption estimation step in accordance with a difference between the energy consumption in the predetermined section estimated in the energy consumption estimation step and the actual energy consumption in the predetermined section identified in the actual energy consumption identification step.

BRIEF DESCRIPTION OF DRAWINGS

FIG. 3 is a diagram illustrating a configuration example of a vehicle information table.

FIG. 4 is a diagram illustrating a configuration example of a physical information table.

FIG. 8 are diagrams illustrating a concept of the power consumption correction processing.

DESCRIPTION OF EMBODIMENTS

Figure 1:
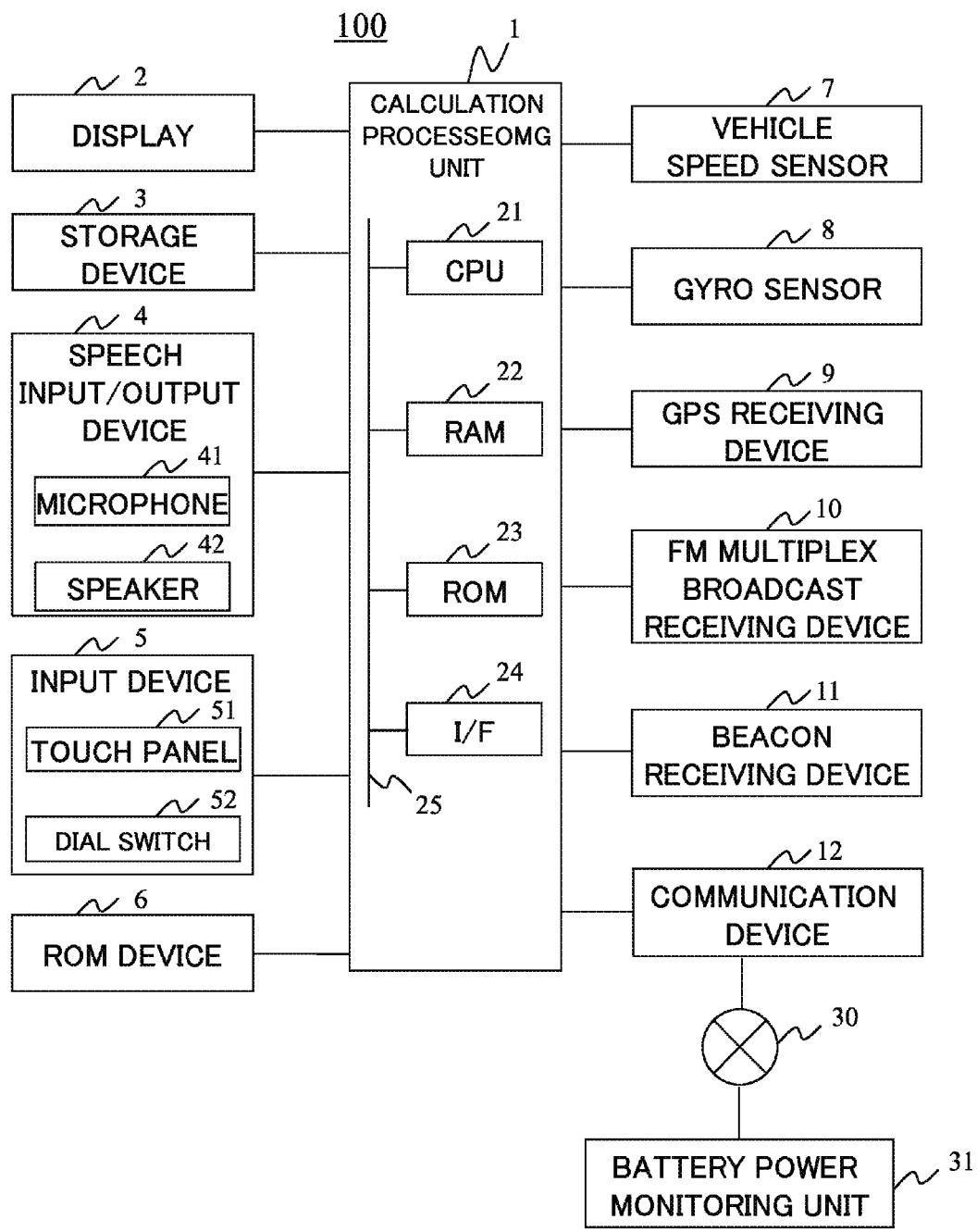
FIG. 1 is a schematic configuration diagram of a navigation device.

Referring to the drawings, a description is now given of a navigation device 100, which is an in-vehicle device to which a first embodiment of the present invention is applied.

FIG. 1 illustrates a configuration diagram of the navigation device 100. The navigation device 100 includes a calculation processing part 1, a display 2, a storage device 3, a speech input/output device 4 (a microphone 41 as a speech input device, and a speaker 42 as a speech output device), an input device 5, a ROM device 6, a vehicle speed sensor 7, a gyro sensor 8, a global positioning system (GPS) receiving device 9, an FM multiplex broadcast receiving device 10, a beacon receiving device 11, and a communication device 12.

The calculation processing part 1 is a central unit for carrying out various types of processing. For example, the calculation processing part 1 detects a current location based on information output from the various sensors 7 and 8, the GPS receiving device 9, the FM multiplex broadcast receiving device 10, and the like. Moreover, the calculation processing part 1 reads map data required for display from the storage device 3 or the ROM device 6 based on the acquired current location information.

Moreover, the calculation processing part 1 graphically deploys the read map data, and displays the graphically deployed map data superimposed with a mark representing the current location on the display 2. Moreover, the calculation processing part 1 uses the map data and the like stored in the storage device 3 or the ROM device 6 to search for an optimal path (recommended path) that connects the current location or a start location instructed by a user and a destination location (or a via location or a drop-in location). Moreover, the calculation processing part 1 navigates the user by means of the speaker 42 and the display 2.

The calculation processing part 1 of the navigation device 100 has such a structure that respective devices are connected to each other by a bus 25. The calculation processing part 1 includes a central processing unit (CPU) 21 for carrying out various types of processing such as numerical calculation and control of the respective devices, a random access memory (RAM) 22 for storing map data read from the storage device 3, calculated data, and the like, a read only memory (ROM) 23 for storing programs and data, and an interface (I/F) 24 for connecting various types of hardware to the calculation processing part 1.

The display 2 is a unit for displaying graphics information generated by the calculation processing part 1 and the like. The display 2 is constructed by a liquid crystal display, an organic EL display, or the like.

The storage device 3 is constructed by a storage medium which is at least readable and writable, such as a hard disk drive (HDD) and a nonvolatile memory card.

The storage medium stores a link table 200 which is map data (including link data on links constructing roads on map) required for an ordinary path search device, a vehicle information table 300 for storing information on a vehicle, a physical information table 400 for storing physical constants and the like used for various types of calculation and the like, a travel history table 500 for storing information on history of travel, and the like.

Figure 2:
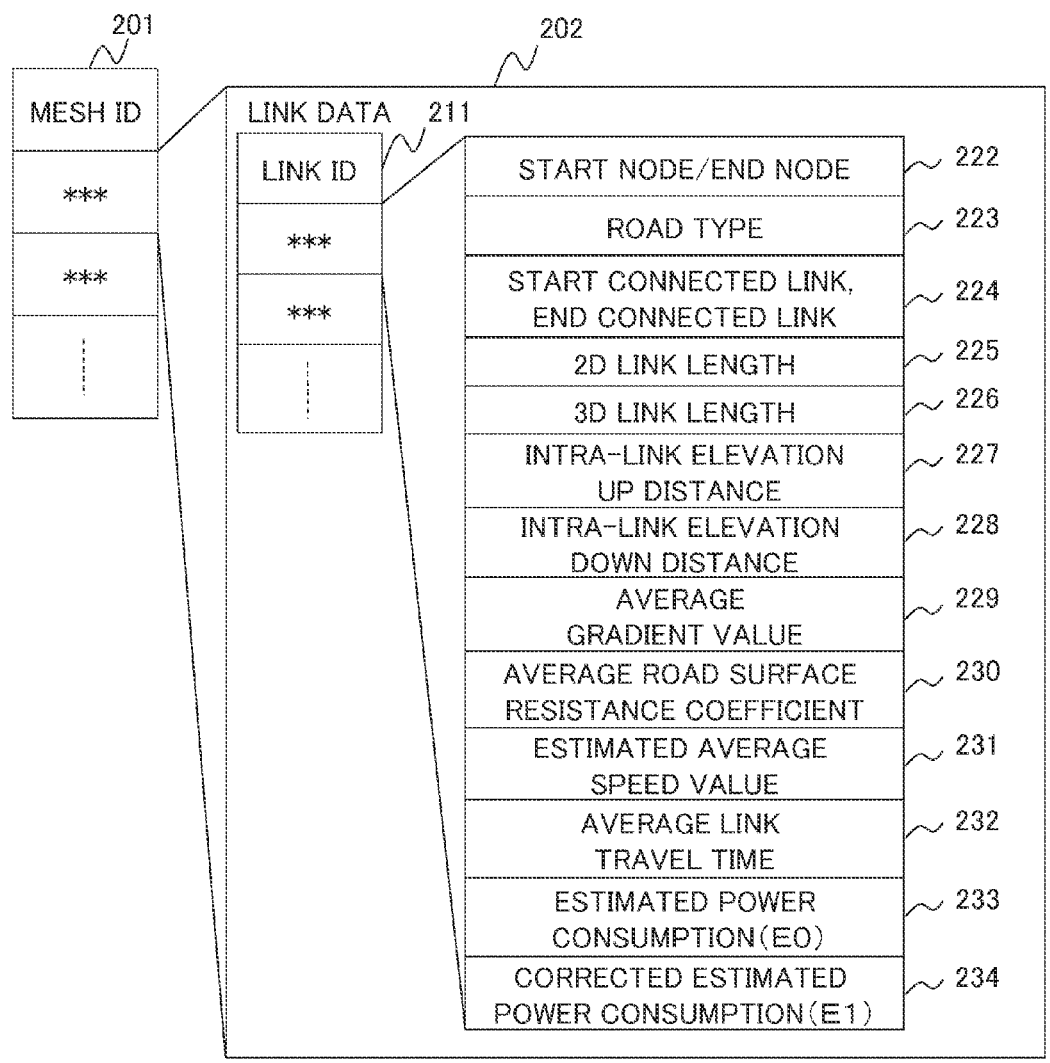
FIG. 2 is a diagram illustrating a configuration of a link table.

FIG. 2 is a diagram illustrating a configuration of the link table 200. The link table 200 includes, for each identification code (mesh ID) 201 of a mesh which is an area delimited on the map, link data 202 for each of links constructing roads included in the mesh area.

The link data 202 includes, for each link ID 211 which is an identifier of a link, coordinate information 222 on two nodes (start node and end node) constructing the link, a road type 223 representing a type of a road including the link, a start connected link and end connected link 224 for identifying a start connected link, which is a link connected to the start node of the link, and an end connected link, which is a link connected to the end node of the link, a 2D link length 225 representing a length of the link on a two-dimensional plane without considering the height, a 3D link length 226 representing a length of the link considering the height, an intra-link elevation up distance 227 representing an accumulated elevation increase amount of upslope portions existing in the link, an intra-link elevation down distance 228 representing an accumulated elevation decrease amount of downslope portions existing in the link, an average gradient value 229 representing an average gradient acquired by dividing a difference in elevation between the start point and the end point of the link by the distance from the start point to the end point, an average road surface resistance coefficient 230 representing an average road surface resistance coefficient of the link, an estimated average speed value 231 stored in advance as an average speed of traveling on the link, an average link travel time 232 stored in advance as an average time required for traveling on the link, an estimated power consumption (E0) 233 on a model estimated to be required to travel on the link, and a corrected estimated power consumption (E1) 234 which is a value acquired by correcting the estimated power consumption based on actual performance.

Note that, the two nodes constructing the link are discriminated as the start node and the end node, thereby managing the links in an up direction and a down direction of the same road as independent links.

FIG. 3 is a diagram illustrating a configuration of the vehicle information table 300. The vehicle information table 300 includes various types of information on a vehicle on which the navigation device 100 is equipped. In other words, the stored information varies depending on a type, a model, and a grade of the vehicle on which the navigation device 100 is equipped.

The vehicle information table 300 includes a vehicle weight (W) 301, which is information for identifying a weight of the vehicle, a coefficient of drag (Cd) 302, which is information for identifying a coefficient of drag of the vehicle, a vehicle fontal projected area (S) 303, which is information for identifying a projected area of the front of the vehicle, a basic power consumption (Eeloss) 304, which is information for identifying a basic power consumption, a travel energy conversion efficiency ($\beta$) 305, which is information for identifying a conversion efficiency of travel energy extracted from a power source (such as gasoline or electricity), and a power regeneration efficiency ($\gamma$) 306, which is information for identifying an efficiency relating to regeneration of power. As those values, a combination of values for a plurality of vehicles may be stored in advance, and values corresponding to the model of the specified vehicle may be selectively enabled when the navigation device 100 is installed on the vehicle, or fixed information on the vehicle may be stored in advance.

FIG. 4 is a diagram illustrating a configuration of the physical information table 400. The physical information table 400 includes various types of information on predetermined physical constants.

The physical information table 400 includes a gravitational acceleration (g) 401, which is information for identifying the gravitational acceleration G, and an air density ($\rho$) 402, which is information for identifying the air density. As those values, a plurality of predetermined values for areas where vehicles equipped with the navigation device 100 are to be sold may be included, and may be selectively enabled when the navigation device 100 is installed on the vehicle, or predetermined information may be stored in advance. Alternatively, although not illustrated, values may be reflected in real time via sensors and the like for measuring the gravitational acceleration and the air density, depending on an environment in which the vehicle equipped with the navigation device 100 exists.

Figure 5:
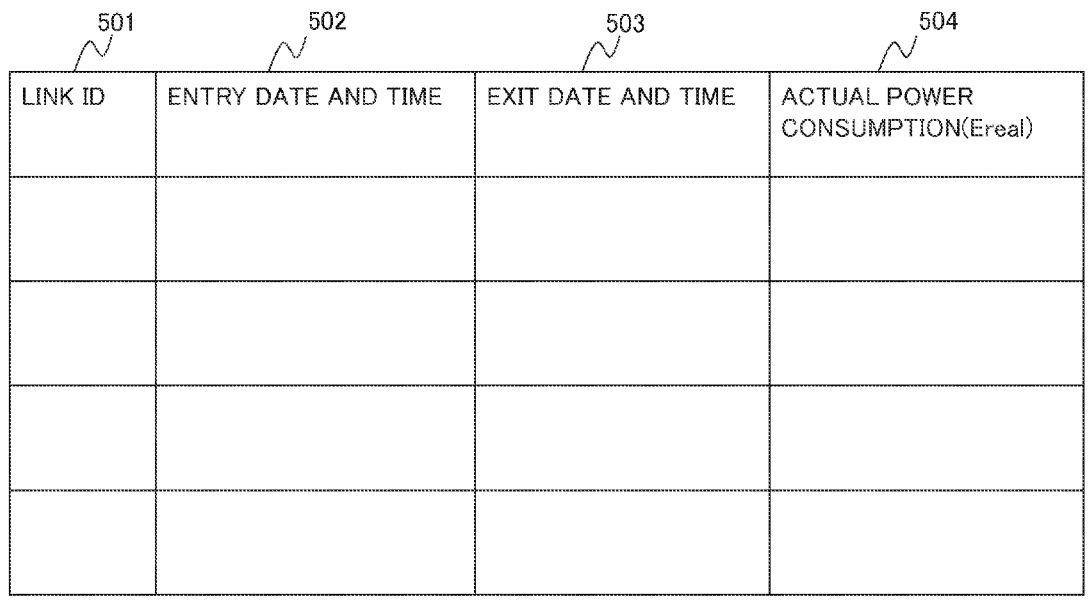
FIG. 5 is a diagram illustrating a configuration example of a travel history table.

FIG. 5 is a diagram illustrating a configuration of the travel history table 500. The travel history table 500 includes various types of information on history of travel of a vehicle equipped with the navigation device 100, and actually consumed energy (power).

The travel history table 500 includes a link ID 501, which is information for identifying a travelled link, an entry date and time 502, which is information for identifying a date and time of entry into the link, an exit date and time 503, which is information for identifying a date and time of exit from the link, and an actual power consumption (Ereal) 504, which is information for identifying power consumed during the travel on the link. The respective values are automatically recorded by a history storage function provided for the navigation device 100 while the navigation device 100 is active. Particularly, regarding the actual power consumption 504, a battery consumption amount periodically (such as every 100 milliseconds) transmitted by a battery power monitoring unit 31 over an onboard network 30 is accumulated for a link to which the current location belongs, and is recorded in association with the link when the vehicle exits from the link.

Referring again to FIG. 1, the speech input/output device 4 includes the microphone 41 as the speech input device and the speaker 42 as the speech output device. The microphone 41 acquires sound external to the navigation device 100 such as a voice uttered by the user or other occupants.

The speaker 42 outputs a message for the user generated by the calculation processing part 1 as a sound signal. The microphone 41 and the speaker 42 are independently installed at predetermined locations in the vehicle. Note that, the microphone 41 and the speaker 42 may be stored in an integrated enclosure. The navigation device 100 can include a plurality of microphones 41 and a plurality of speakers 42.

The input device 5 is a device for receiving a command from the user via an operation by the user. The input device 5 is constructed by a touch panel 51, a dial switch 52, and other hardware switches (not shown) such as a scroll key and a zoom key.

The touch panel 51 is mounted on a display surface side of the display 2, and a display screen can be seen through the touch panel 51. The touch panel 51 identifies a touch position corresponding to X and Y coordinates of an image displayed on the display 2, converts the touch position into the coordinates, and outputs the coordinates. The touch panel 51 is constructed by a pressure-sensitive or electrostatic input detection device.

The dial switch 52 is constructed so as to be able to rotate clockwise and counterclockwise, and generates a pulse signal for every predetermined angle and outputs the pulse signal to the calculation processing part 1. The calculation processing part 1 determines a rotation angle based on the number of pulse signals.

The ROM device 6 is constructed by a storage medium which is at least readable, such as a read only memory (ROM) exemplified as a CD-ROM and a DVD-ROM, or an integrated circuit (IC) card. The storage medium stores, for example, motion picture data, sound data, and the like.

The vehicle speed sensor 7, the gyro sensor 8, and the GPS receiving device 9 are used to detect a current location by the navigation device 100.

The vehicle speed sensor 7 is a sensor for outputting a value used for calculating a vehicle speed.

The gyro sensor 8 is constructed by an optical fiber gyro, an oscillation gyro, or the like, and detects an angular velocity caused by rotation of a moving body.

The GPS receiving device 9 measures a current location, a travel speed, and a travel direction of a moving body by receiving a signal from each of the GPS satellites and measuring a distance between the moving body and each of the GPS satellites and a change rate of the distance for at least three satellites.

The FM multiplex broadcast receiving device 10 receives an FM multiplex broadcast signal transmitted from an FM station. The FM multiplex broadcast includes summarized current traffic information, traffic regulation information, service area/parking area (SA/PA) information, parking lot information, and weather information of the vehicle information communication system (VICS: trademark) information, and character information provided by the radio station as FM multiplex general information.

The beacon receiving device 11 receives summarized current traffic information, traffic regulation information, service area/parking area (SA/PA) information, parking lot information, weather information, and emergency information as exemplified by the VICS information. For example, the beacon receiving device 11 is a receiving device for an optical beacon for optical communication or a radio beacon for radio wave communication.

The communication device 12 is a network interface device for communicating to/from other devices via the onboard network 30 provided on the vehicle equipped with the navigation device 100. The onboard network 30 is, for example, a controller area network (CAN), or a network that enables communications among devices connected by means of a protocol such as FlexRay, but is not limited thereto.

The navigation device 100 can communicate via the communication device 12 and the onboard network 30 to/from the battery power monitoring unit 31, which is a device connected to the battery installed on the vehicle for supplying energy, and other such devices. The battery power monitoring unit 31 monitors and manages a battery capacity of a battery device that accumulates/discharges electricity serving as a power source installed on a vehicle such as an electric vehicle. The battery power monitoring unit 31 then transmits, at a predetermined cycle (such as 100-millisecond cycle), an actual value of the power consumed in the cycle over the CAN. Therefore, the calculation processing part 1 of the navigation device 100 can acquire the transmitted actual value of the power consumption via the communication device 12.

Figure 6:
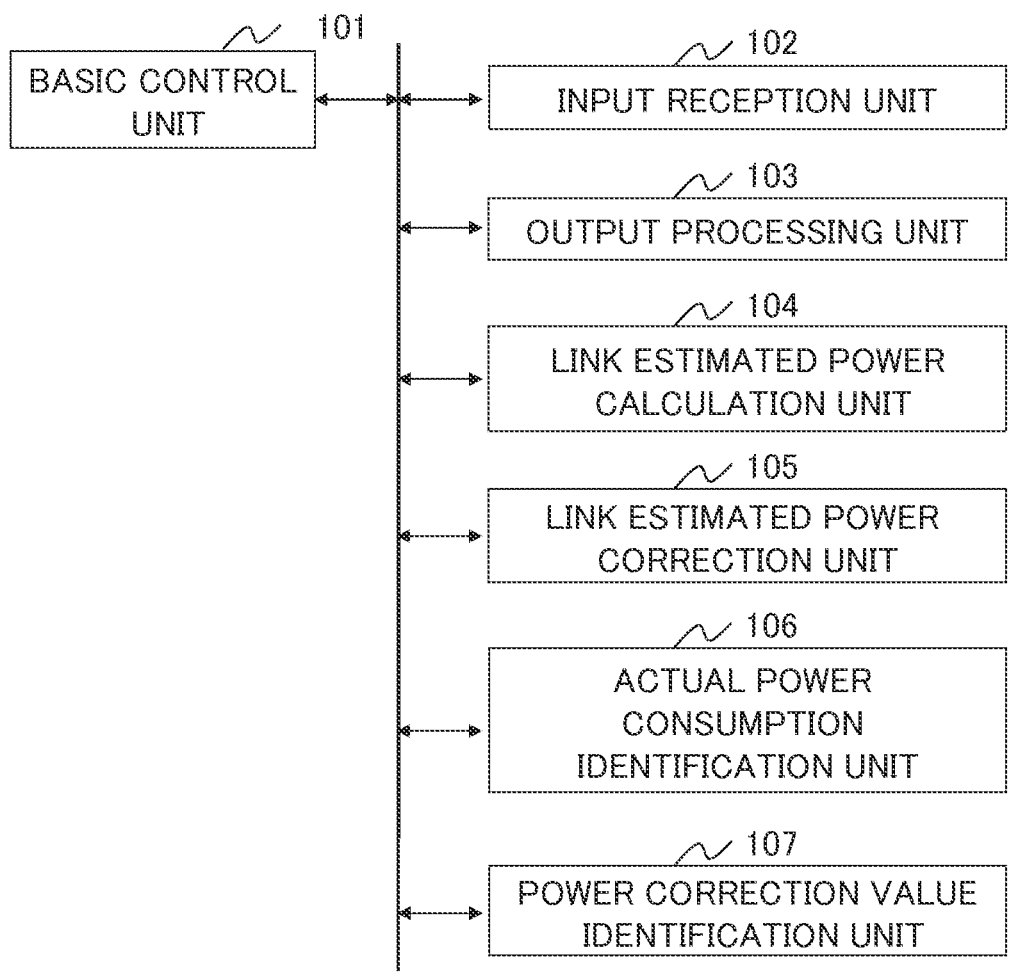
FIG. 6 is a functional configuration diagram of a calculation processing part.

FIG. 6 is a functional block diagram of the calculation processing part 1. As illustrated in FIG. 6, the calculation processing part 1 includes a base control part 101, an input reception part 102, an output processing part 103, a link estimated power calculation part 104, a link estimated power correction part 105, an actual power consumption identification part 106, and a power correction value identification part 107.

Figure 13:
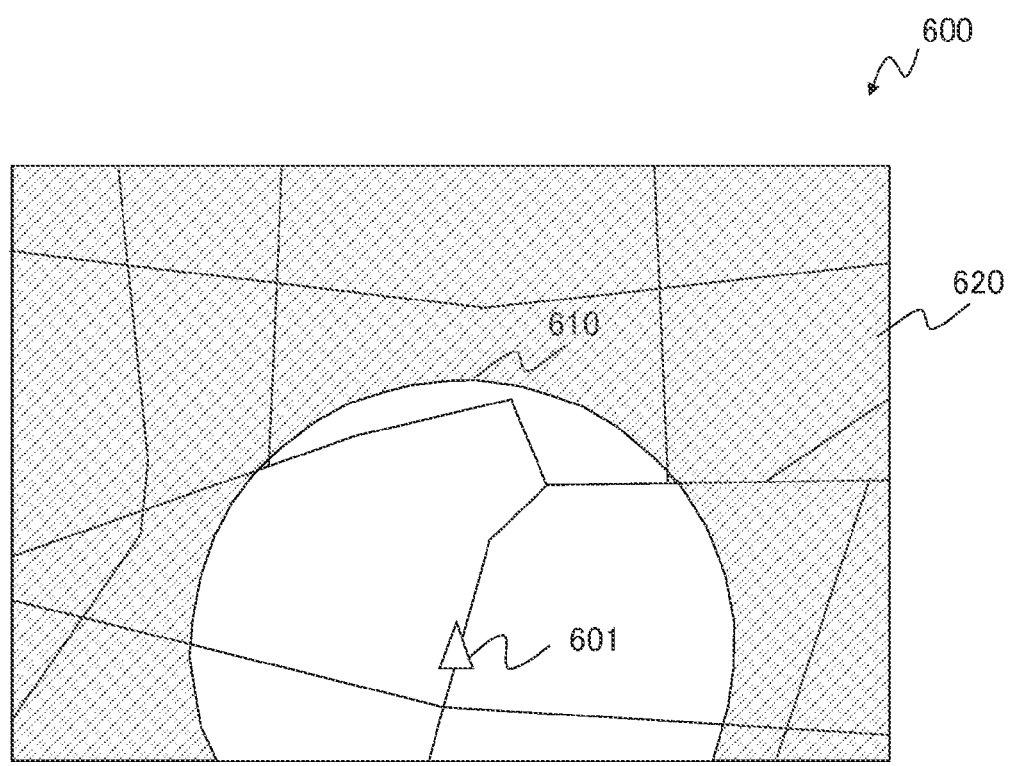
FIG. 13 is a diagram illustrating a display example of a possible travel range.

The base control part 101 is a central functional part for carrying out various types of processing, and controls other processing parts in accordance with processing contents. Moreover, the base control part 101 acquires information from the various sensors, the GPS receiving device 9, and the like, and carries out map matching processing or the like to identify the current location and the vehicle direction, which is a direction in which the front of the vehicle is oriented. Moreover, the base control part 101 associates the date and time of travel and the location to each other and stores travel history for each link in the travel history table 500 as needed. Specifically, the base control part 101 stores a link ID of a link to which the current location belongs in the link ID 501, information for identifying a time and date of entry into the link in the entry date and time 502, and information for identifying a time and date of exit from the link in the exit date and time 503 in the travel history table 500. Further, the base control part 101 outputs a current time in response to a request from each of the processing parts. Moreover, the base control part 101 searches for an optimal path (recommended path) that connects the current location or a start location instructed by the user and a destination, and navigates the user along the path by means of the speaker 42 and the display 2 so as not to depart from the recommended path. Moreover, the base control part 101 calculates a possible travel range based on the remaining amount of the battery, which is the onboard power source, by using an estimated power consumption, and instructs the output processing part 103 to display the map so that a part farther than the possible travel range on the map is dark to highlight the possible travel range as illustrated in FIG. 13. FIG. 13 is an example of a possible travel range display screen 600, illustrating a mark 601 representing the current location, a possible travel range 610, and an impossible travel range 620. An area on the map corresponding to the impossible travel range 620 is displayed darker than the possible travel range 610.

The input reception part 102 receives a command from the user input via the input device 5 or the microphone 41, and transmits a request content thereof to the base control part 101.

The output processing part 103 receives screen information to be displayed, converts the screen information into a signal used for drawing on the display 2, and instructs the display 2 to carry out drawing.

The link estimated power calculation part 104 calculates an estimated value of power, which is energy required for traveling, for each of links within a predetermined range. Specifically, the link estimated power calculation part 104 calculates, for each of links included in a predetermined range (such as a circle having a radius of 5 kilometers about the current location, or, if a recommended path is set, a part or whole of links constructing the recommended path), an estimated power consumption E0, which is the basic power relating to the travel, by following predetermined model data using the energy conservation law and by using the information on the vehicle and the information on roads.

A more specific description is now given of means for the link estimated power calculation part 104 to calculate the estimated power consumption E0 for each link. The link estimated power calculation part 104 calculates, for a predetermined link, an acceleration resistance loss power Ep1, which is an energy loss caused by vehicle acceleration, by using Equation (1).

$$Ep1 = \text{vehicle weight}(Vehicle\_weight) \times \text{vehicle travel acceleration}(dV/dt) \times \text{travel distance}(L) \times \text{travel energy conversion efficiency}(\beta) \quad \text{Equation (1)}$$

Note that, on this occasion, the link estimated power calculation part 104 calculates Equation (1) by acquiring the vehicle weight from the vehicle weight (W) 301 in the vehicle information table 300, acquiring the vehicle travel acceleration by dividing the estimated average speed value 231 by the average link travel time 232 in the link table 200, acquiring the travel distance from the 3D link length 226 in the link table 200, and acquiring the travel energy conversion efficiency from the travel energy conversion efficiency ($\beta$) 305 in the vehicle information table 300.

Then, the link estimated power calculation part 104 calculates, for the link, a deceleration resistance gain power Ep1', which is an energy gain caused by vehicle deceleration, by using Equation (1)'.

$$Ep1' = \text{vehicle weight}(Vehicle\_weight) \times \text{vehicle travel acceleration}(dV/dt) \times \text{travel distance}(L) \times \text{power regeneration efficiency}(\gamma) \quad \text{Equation (1)'}$$

Note that, on this occasion, the link estimated power calculation part 104 calculates Equation (1)' by acquiring the vehicle weight from the vehicle weight (W) 301 in the vehicle information table 300, acquiring the vehicle travel acceleration by dividing the estimated average speed value 231 by the average link travel time 232 in the link table 200, acquiring the travel distance from the 3D link length 226 in the link table 200, and acquiring the power regeneration efficiency from the power regeneration efficiency ($\gamma$) 306 in the vehicle information table 300.

Moreover, the link estimated power calculation part 104 calculates, for the link, a gradient resistance loss power Ep2, which is an energy loss caused by a relative increase in elevation, by using Equation (2).

$$Ep2 = \text{vehicle weight}(Vehicle\_weight) \times \text{gravitational acceleration}(g) \times \text{intra-link elevation up distance}(\Delta H) \times \text{travel distance}(L) \times \text{travel energy conversion efficiency}(\beta) \quad \text{Equation (2)}$$

Note that, on this occasion, the link estimated power calculation part 104 calculates Equation (2) by acquiring the vehicle weight from the vehicle weight (W) 301 in the vehicle information table 300, acquiring the gravitational acceleration from the gravitational acceleration 401 in the physical information table 400, acquiring the intra-link elevation up distance from the intra-link elevation up distance 227 in the link table 200, acquiring the travel distance from the 3D link length 226 in the link table 200, and acquiring the travel energy conversion efficiency from the travel energy conversion efficiency ($\beta$) 305 in the vehicle information table 300.

Moreover, the link estimated power calculation part 104 calculates, for the link, a gradient resistance gain power Ep2', which is an energy gain caused by a relative decrease in elevation, by using Equation (2)'.

$$Ep2' = \text{vehicle weight}(Vehicle\_weight) \times \text{gravitational acceleration}(g) \times \text{intra-link elevation down distance}(\Delta H') \times \text{travel distance}(L) \times \text{power regeneration efficiency}(\gamma) \quad \text{Equation (2)'}$$

Note that, on this occasion, the link estimated power calculation part 104 calculates Equation (2)' by acquiring the vehicle weight from the vehicle weight (W) 301 in the vehicle information table 300, acquiring the gravitational acceleration from the gravitational acceleration 401 in the physical information table 400, acquiring the intra-link elevation down distance from the intra-link elevation down distance 228 in the link table 200, acquiring the travel distance from the 3D link length 226 in the link table 200, and acquiring the travel energy conversion efficiency from the power regeneration efficiency ($\gamma$) 306 in the vehicle information table 300.

Moreover, the link estimated power calculation part 104 calculates, for the link, a road surface resistance loss power Ep3, which is an energy loss caused by a friction resistance against a road surface, by using Equation (3).

$$Ep3 = \text{vehicle weight}(Vehicle\_weight) \times \text{gravitational acceleration}(g) \times \text{road surface resistance coefficient (Road\_resistance\_coefficent)} \times \text{normal force correction coefficient } (\cos \theta) \times \text{travel distance}(L) \times \text{travel energy conversion efficiency }(\beta) \quad \text{Equation (3)}$$

Note that, on this occasion, the link estimated power calculation part 104 calculates Equation (3) by acquiring the vehicle weight from the vehicle weight (W) 301 in the vehicle information table 300, acquiring the gravitational acceleration from the gravitational acceleration 401 in the physical information table 400, acquiring the road surface resistance coefficient from the average road surface resistance coefficient 230 in the link table 200, calculating the normal force correction coefficient by dividing the 2D link length 225 by the 3D link length 226 in the link table 200 to use, acquiring the travel distance from the 3D link length 226 in the link table 200, and acquiring the travel energy conversion efficiency from the travel energy conversion efficiency ($\beta$) 305 in the vehicle information table 300.

Moreover, the link estimated power calculation part 104 calculates, for the link, an air resistance loss power Ep4, which is an energy loss caused by the air resistance, by using Equation (4).

$Ep4$=coefficient of drag (Aerodynamics_coefficient)× air density($Rou\_a$)×vehicle fontal projected area (Front_projection_area)×square of vehicle travel speed($V$)×travel distance($L$)×travel energy conversion efficiency ($\beta$)     Equation (4)

Note that, on this occasion, the link estimated power calculation part 104 calculates Equation (4) by acquiring the coefficient of drag from the coefficient of drag (Cd) 302 in the vehicle information table 300, acquiring the air density from the air density ($\rho$) 402 in the physical information table 400, acquiring the vehicle frontal projected area from the vehicle frontal projected area (S) 303 in the vehicle information table 300, acquiring the vehicle travel speed from the estimated average speed value 231 in the link table 200, acquiring the travel distance from the 3D link length 226 in the link table 200, and acquiring the travel energy conversion efficiency from the travel energy conversion efficiency ($\beta$) 305 in the vehicle information table 300.

Moreover, the link estimated power calculation part 104 sums Ep1, Ep1', Ep2, Ep2', Ep3, and Ep4 acquired by means of Equations (1), (1)', (2), (2)', (3), and (4) for each link, thereby calculating a total travel power consumption EpALL_RUN.

Moreover, the link estimated power calculation part 104 calculates, for the link, a power loss EpALL_UNIT, which is consumed by vehicle electrical accessories, by using Equation (5).

$EpALL\_UNIT$=basic power consumption(Eeloss)× average link travel time($T$)     Equation (5)

Note that, on this occasion, the link estimated power calculation part 104 calculates Equation (5) by acquiring the basic power consumption from the basic power consumption (Eeloss) 304 in the vehicle information table 300, and acquiring the average link travel time from the average link travel time 232 in the link table 200.

Then, the link estimated power calculation part 104 calculates, for each link, as the estimated power consumption E0 on the link, a sum of the total travel power consumption EpALL_RUN and the power loss EpALL_UNIT consumed by the vehicle electrical accessories.

The link estimated power correction part 105 corrects the estimated power consumption E0 calculated by the link estimated power calculation part 104 by using the power correction value identified by the power correction value identification part 107, thereby calculating a corrected estimated power consumption E1.

The actual power consumption identification part 106 identifies power that is actually used for each link. Specifically, the actual power consumption identification part 106 identifies, for each link to which the current location has belonged, the power consumption by accumulating an amount of power consumption transmitted at the predetermined cycle from the battery power monitoring unit 31 to the onboard network 30 during a period when the current location belongs to the link. Then, the actual power consumption identification part 106 associates the identified power consumption to the link for which the exit date and time is recorded in the travel history table 500, and stores the power consumption associated with the link in the actual power consumption (Ereal) 504.

The power correction value identification part 107 identifies a correction value for correcting the estimated power consumption based on a difference between the actual power consumption and the estimated power consumption. Specifically, when the actual power consumption exceeds a value acquired by reflecting the maximum error rate of the estimated power consumption, the power correction value identification part 107 calculates a correction value for increasing the estimated power consumption depending on a degree of the excess. When the actual power consumption falls below a value acquired by reflecting the minimum error rate of the estimated power consumption, the power correction value identification part 107 calculates a correction value for maintaining the estimated power consumption. When the actual power consumption falls in a range between the value acquired by reflecting the minimum error rate of the estimated power consumption and the value acquired by reflecting the maximum error rate of the estimated power consumption, the power correction value identification part 107 identifies the same correction value as an already-set correction value.

The respective functional parts of the calculation processing part 1, namely, the base control part 101, the input reception part 102, the output processing part 103, the link estimated power calculation part 104, the link estimated power correction part 105, the actual power consumption identification part 106, and the power correction value identification part 107 are constructed by the CPU 21 reading predetermined programs. For that purpose, the programs for realizing the processing of the respective functional parts are stored in the RAM 22.

Note that, the respective components are acquired by classifying the configuration of the navigation device 100 depending on main processing contents for the sake of easy understanding. Therefore, the classification method and the name of the components do not restrict the present invention. The configuration of the navigation device 100 can be further classified into a large number of components depending on processing contents. Moreover, the configuration can be classified so that a single component can carry out more pieces of processing.

Moreover, each of the functional parts may be constructed by hardware (such as ASIC and GPU). Moreover, the processing of each of the functional parts may be carried out by a single piece of hardware or a plurality of pieces of hardware.

Figure 7:
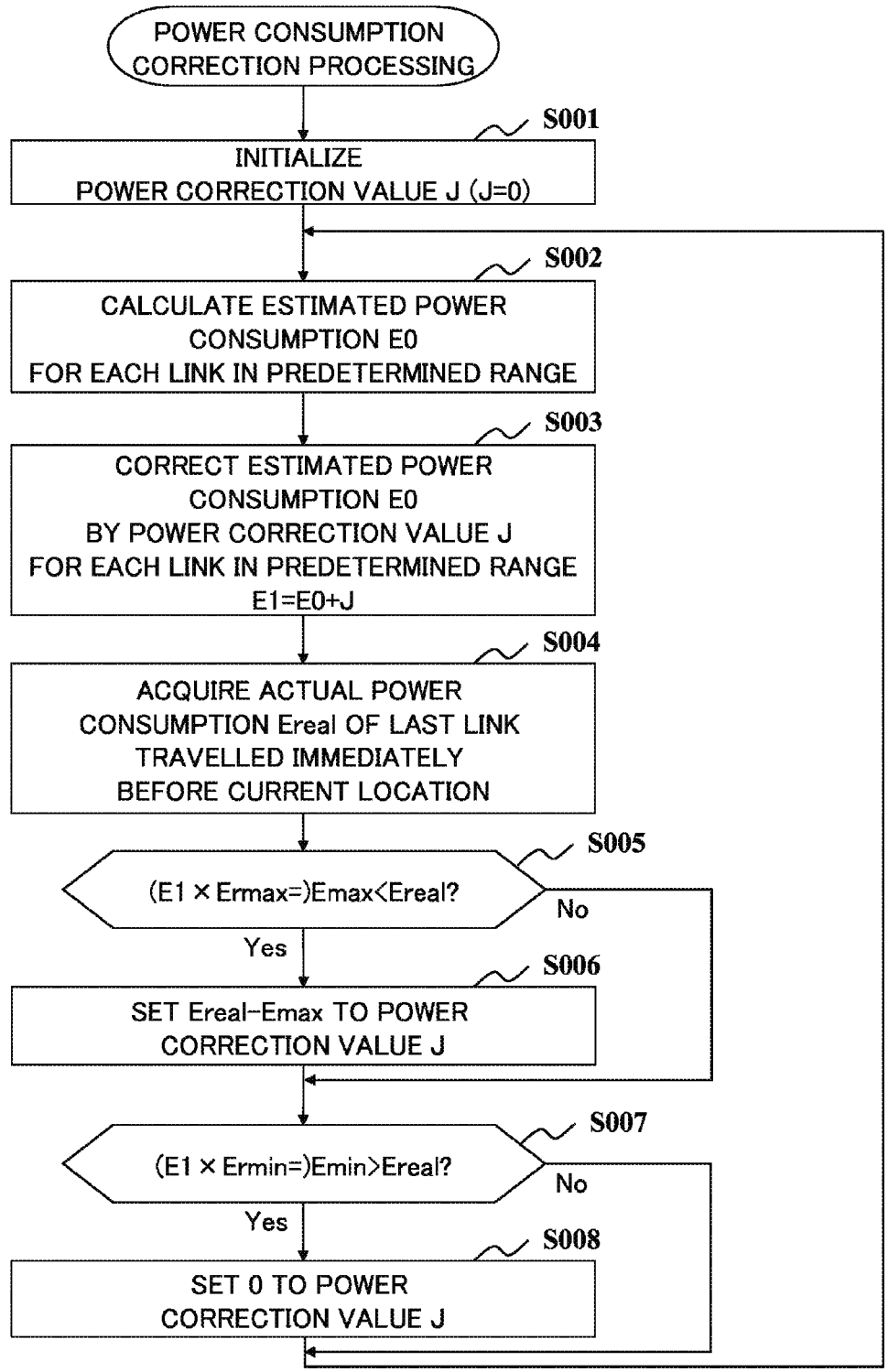
FIG. 7 is a flowchart of power consumption correction processing.

[Description of Operations] A description is now given of operations of the navigation device 100. FIG. 7 is a flowchart of power consumption correction processing. This flow is started when the navigation device 100 starts the operation.

First, the power correction value identification part 107 initializes a power correction value J (Step S001). Specifically, the power correction value identification part 107 sets the value of the power correction value J used as the power correction value to zero.

Then, the link estimated power calculation part 104 calculates the estimated power consumption E0 for each of links within a predetermined range (Step S002). Specifically, the link estimated power calculation part 104 acquires information for identifying the current location from the base control part 101, requests the base control part 101 to extract one or a plurality of links included in a predetermined range with reference to the current location (such as a circle having a radius of 5 kilometers about the current location, or, if a recommended path is set, a part or whole of links constructing the recommended path), and acquires link IDs of the extracted links from the base control part 101. Then, for each of the links identified by the acquired link IDs, the estimated power consumption E0 is calculated by the above-mentioned calculation, and is stored in the estimated power consumption (E0) 233 in the link table 200.

Then, the link estimated power correction part 105 corrects the estimated power consumption E0 by using the power correction value J for each of the links in the predetermined range to calculate the corrected estimated power consumption E1 (Step S003). Specifically, the link estimated power correction part 105 adds the value of the power correction value J to the estimated power consumption E0 to calculate the corrected estimated power consumption E1 for each of the links identified by the link IDs identified in Step S002. Then, the link estimated power correction part 105 stores the calculated E1 of each of the links in the corrected estimated power consumption (E1) 234 in the link table 200.

Then, the actual power consumption identification part 106 acquires information for identifying the actual power consumption Ereal of the last link travelled immediately before the current location (Step S004). Specifically, the actual power consumption identification part 106 acquires the link ID of the link to which the current location belongs from the base control part 101, and searches the travel history table 500 to identify the link travelled immediately before the link to which the current location belongs. Then, the actual power consumption identification part 106 acquires the value of the actual power consumption (Ereal) 504 for identifying the accumulated amount of the power actually consumed on the link.

Then, the power correction value identification part 107 determines whether or not the acquired information on Ereal exceeds the value of Emax which is a value acquired by reflecting the maximum error rate of the estimated power consumption (Step S005). Specifically, the power correction value identification part 107 compares the value of Ereal, which is the actual power consumption of the link travelled immediately before and acquired in Step S004, and the value of Emax, which is calculated by multiplying the value of the corrected estimated power consumption E1 calculated for the link by a predetermined maximum error rate (such as 120%), and determines whether or not the value of Ereal exceeds the value of Emax. Note that, the maximum error rate is a value for identifying a range of a predetermined permissible maximum error. When the value of Ereal does not exceed the value of Emax, that is, when the value of Ereal is equal to or less than the value of Emax, the power correction value identification part 107 causes the control to proceed to Step S007 described below.

When the value of Ereal exceeds the value of Emax ("Yes" in Step S005), the power correction value identification part 107 sets the difference between Ereal and Emax to the power correction value J (Step S006). Specifically, the power correction value identification part 107 subtracts the value of Emax from Ereal, and sets a resulting value of the subtraction as the power correction value J.

Then, the power correction value identification part 107 determines whether or not the acquired information on Ereal falls below the value of Emin, which is a value acquired by reflecting the minimum error rate of the estimated power consumption (Step S007). Specifically, the power correction value identification part 107 compares the value of Ereal, which is the actual power consumption of the link travelled immediately before and acquired in Step S004, and the value of Emin calculated by multiplying the value of the corrected estimated power consumption E1 calculated for the link by a predetermined minimum error rate (such as 80%), and determines whether or not the value of Ereal falls below the value of Emin. Note that, the minimum error rate is a value for identifying a range of a predetermined permissible minimum error. When the value of Ereal does not fall below the value of Emin, that is, when the value of Ereal is equal to or more than the value of Emin, the power correction value identification part 107 returns the control to Step S002.

When the value of Ereal falls below the value of Emin ("Yes" in Step S007), the power correction value identification part 107 sets zero to the power correction value J (Step S008). Specifically, the power correction value identification part 107 sets the power correction value J to zero. Then, the power correction value identification part 107 returns the control to Step S002.

A description has been given of the processing flow of the power consumption correction processing. The power consumption correction processing can change the correction value used for subsequent power consumption estimation based on the difference between the power consumption estimated for the link travelled immediately before and the actually consumed power consumption. In other words, it is considered that, if the difference between the estimated energy consumption and the actual amount of the energy consumption is equal to or more than a predetermined threshold, the estimated energy consumption in the predetermined section can be corrected. As a result, it is considered that more accurate estimation can be carried out in a manner that, for example, a consumption that changes depending on a wind is identified based on an actually measured value on a windy day and the consumption is reflected to the correction amount. Particularly, on an electric vehicle (EV), a sufficiently large amount of electricity serving as a power source cannot be accumulated due to performance of a battery or the like, and hence it is considered that an effect of the more accurate estimation is large by taking into account of a relatively large influence of unexpected external factors on a cruising distance.

Referring to FIGS. 8 (a), 8 (b) and 9, a description is now given of a concept of the power consumption correction processing. FIG. 8(a) is a diagram illustrating an overview of processing of identifying the value of J when the value of the actual power consumption Ereal exceeds the value of Emax acquired by reflecting the maximum error rate to the estimated power consumption E1 of the link. In other words, in this situation, a value of Emin 510 acquired by reflecting a minimum error rate Ermin to the corrected estimated power consumption (E1) 502 acquired by adding the power correction value J 501 to the estimated power consumption (E0) 500 estimated in advance, and a value of Emax 511 acquired by reflecting a maximum error rate Ermax to the corrected estimated power consumption (E1) 502 have been identified. On this occasion, the value of the actual power consumption Ereal 520 exceeds Emax, and hence an excess 521 is used to update the power correction value J.

FIG. 8(b) is a diagram illustrating an overview of processing of identifying the value of J when the value of the actual power consumption Ereal is equal to or less than the value of Emax acquired by reflecting the maximum error rate to the estimated power consumption E1 of the link, and is equal to or more than the value of Emin acquired by reflecting the minimum error rate to the estimated power consumption E1 of the link. In other words, in this situation, the value of Emin 510 acquired by reflecting the minimum error rate Ermin to the corrected estimated power consumption (E1) 502 acquired by adding the power correction value J 501 to the estimated power consumption (E0) 500 estimated in advance, and the value of Emax 511 acquired by reflecting the maximum error rate Ermax to the corrected estimated power consumption (E1) 502 have been identified. On this occasion, the value of the actual power consumption Ereal 530 is equal to or more than Emin and equal to or less than Emax, and hence the power correction value J is not updated but maintained.

Figure 9:
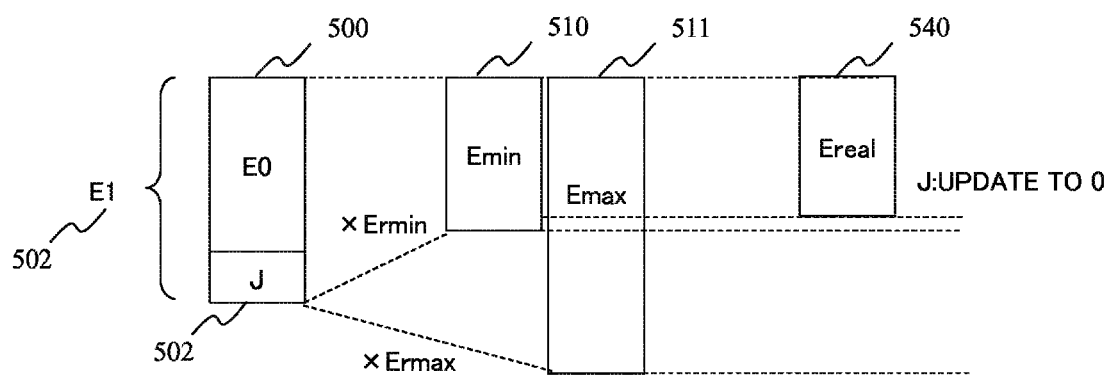
FIG. 9 is a diagram illustrating the concept of the power consumption correction processing.

FIG. 9 is a diagram illustrating an overview of processing of identifying the value of J when the value of the actual power consumption Ereal falls below the value of Emin acquired by reflecting the minimum error rate to the estimated power consumption E1 of the link. In other words, in this situation, the value of Emin 510 acquired by reflecting the minimum error rate Ermin to the corrected estimated power consumption (E1) 502 acquired by adding the power correction value J 501 to the estimated power consumption (E0) 500 estimated in advance, and the value of Emax 511 acquired by reflecting the maximum error rate Ermax to the corrected estimated power consumption (E1) 502 have been identified. On this occasion, the value of the actual power consumption Ereal 540 falls below Emin, and hence the power correction value J is set to zero. Note that, on this occasion, the value of the power correction value J is not set to a difference from Emin because of the following reason. That is, if the estimated power consumption increases, a trouble in terms of driving such as a reduced possible travel distance is more likely to occur, but if the estimated power consumption reduces, it is considered that the possible travel distance increases. In such a case, it is estimated that a trouble in terms of driving is less likely to occur.

In the above section, the first embodiment of the present invention has been described.

According to the first embodiment of the present invention, the navigation device 100 can realize the estimation of the energy consumption at a higher accuracy with the simpler method. More specifically, the navigation device 100 corrects the estimated value calculated for the energy consumption relating to the travel on a link based on the predetermined model by using the correction value based on the difference between the actual value and the estimated value to estimate the energy consumption. It is thus considered that the power consumption can be estimated while the influence not included in the model such as an environmental error is reflected. This means that, for example, in such a case of realizing a function of calculating the cruising range by using the corrected estimated energy consumption (power) and of highlighting the cruising range by darkening a portion outside the range on the map, it is considered that a function having a higher accuracy can be realized. In addition, when a route is guided along a recommended route, the first embodiment can be applied to a function of, by using the predicted value of the used energy and information on positions of facilities (such as charge stations) for supplementing energy, reminding the supplement locations of the energy. In addition, also in such a case of realizing a function such as a so-called ecology path search function of searching for a path having the smallest predicted energy consumption by priority, it is considered that a function having a higher accuracy can be realized.

Figure 10:
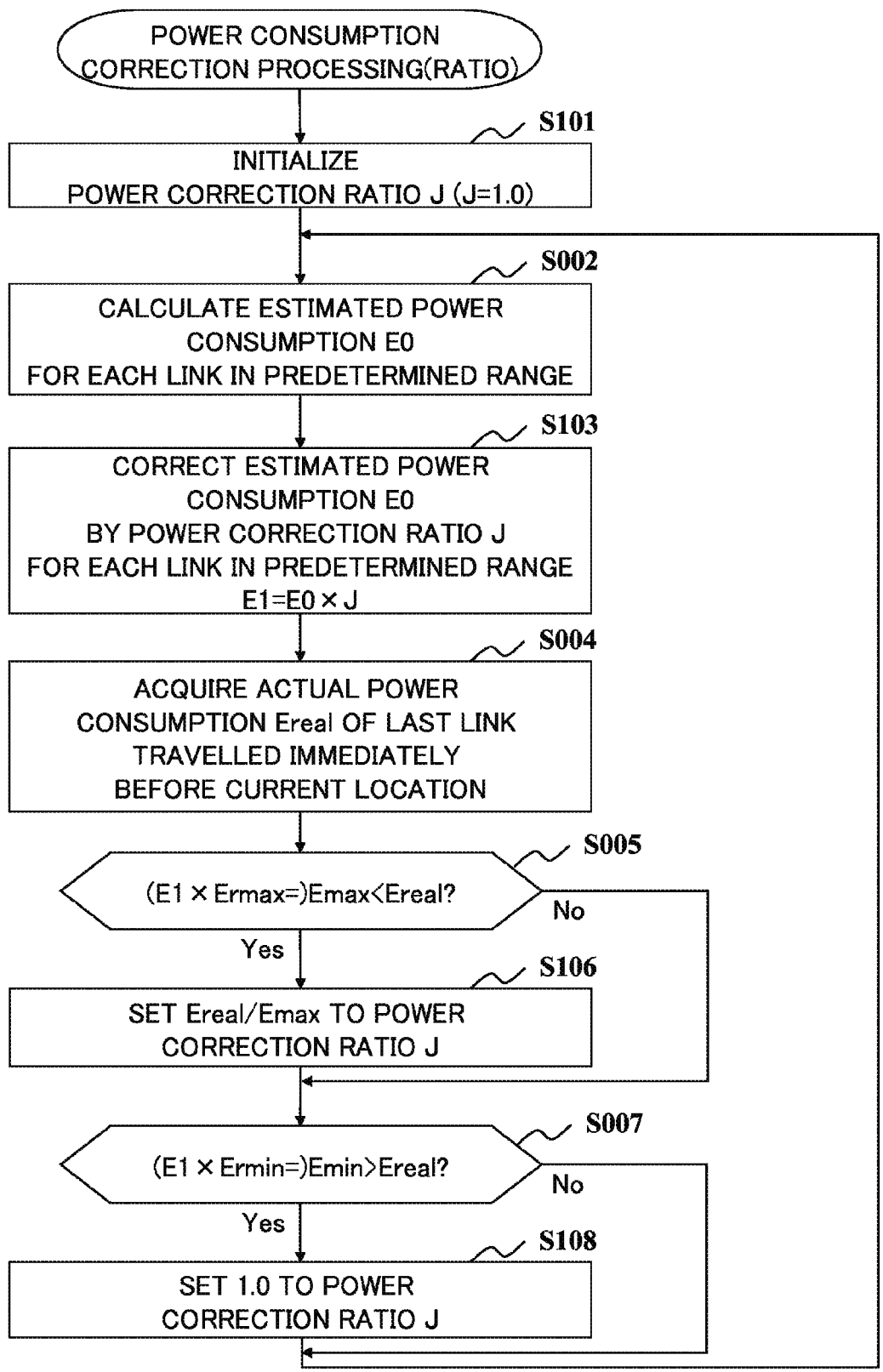
FIG. 10 is a flowchart illustrating a modified example of the power consumption correction processing.

The present invention is not limited to the first embodiment. The first embodiment can be modified in various ways within the technical idea of the present invention. For example, in the power consumption correction processing according to the first embodiment, the power correction value J is added to the estimated power consumption E0 to correct the power consumption of each of the links, but the correction is not limited to this case. For example, the power correction value J may be replaced by a power correction ratio J, and the correction may be carried out by multiplying the value of the estimated power consumption E0 by the value of the power correction ratio J. This modification can absorb a difference in a degree of correction caused by a difference in the link length which actually varies from link to link, thus enabling estimation closer to reality. Referring to FIG. 10, a specific description is now given of the modified example.

FIG. 10 is a flowchart illustrating the modified example of the power consumption correction processing. In this modified example, the flowchart is basically the same as the flowchart according to the first embodiment, but partially different in processing. Therefore, a description is mainly given of the different points.

The power correction value J is initialized to zero in Step S001 of the power consumption correction processing according to the first embodiment, but, in Step S101 corresponding to the processing of Step S001, the power correction ratio J is initialized to "1.0" (Step S101).

Moreover, in Step S103, the corrected estimated power consumption E1 is calculated by multiplying the estimated power consumption E0 by the power correction ratio J for each of links in a predetermined range (Step S103).

Moreover, processing of Step S106 is processing for a case where the value of Ereal exceeds the value of Emax, and the value of the power correction ratio J is set to a value acquired by dividing Ereal by Emax (Step S106).

Moreover, processing of Step S108 is processing for a case where the value of Ereal falls below the value of Emin, and the value of the power correction ratio J is set to an initial value "1.0" (Step S108).

A description has been given of the modified example. As a result of the modification, the correction can be carried out while the difference in the distance of each link is taken into account, and hence it is considered that the navigation device 100 can carry out estimation closer to the reality.

Note that, the power correction value J is replaced by the power correction ratio J in the modified example of the first embodiment, but the modified example is not limited to this case. For example, in Step S003 of the power consumption correction processing according to the first embodiment, a converted power correction value J' may be calculated by multiplying the power correction value J by a ratio of the distance of the link subject to correction to the distance of the link for which Ereal is acquired, and the converted power correction value J' may be added to the estimated power consumption E0 of the link subject to correction, thereby calculating the corrected estimated power consumption E1.

Moreover, the actual value used by the navigation device 100 installed on another vehicle cannot be borrowed in the first embodiment, but the navigation device 100 may use the correction value actually measured on another navigation device 100. A description is now given of a second embodiment configured as described above.

The second embodiment is configured basically in the same way as the first embodiment. Therefore, the description is given while the description of the same configuration is omitted. The navigation device 100 further includes, in addition to the same configuration as of the first embodiment, a wireless communication device using a cellular phone network or the like for connection to an external network such as the Internet. Therefore, the navigation device 100 can communicate to/from another device via the external network.

Figure 11:
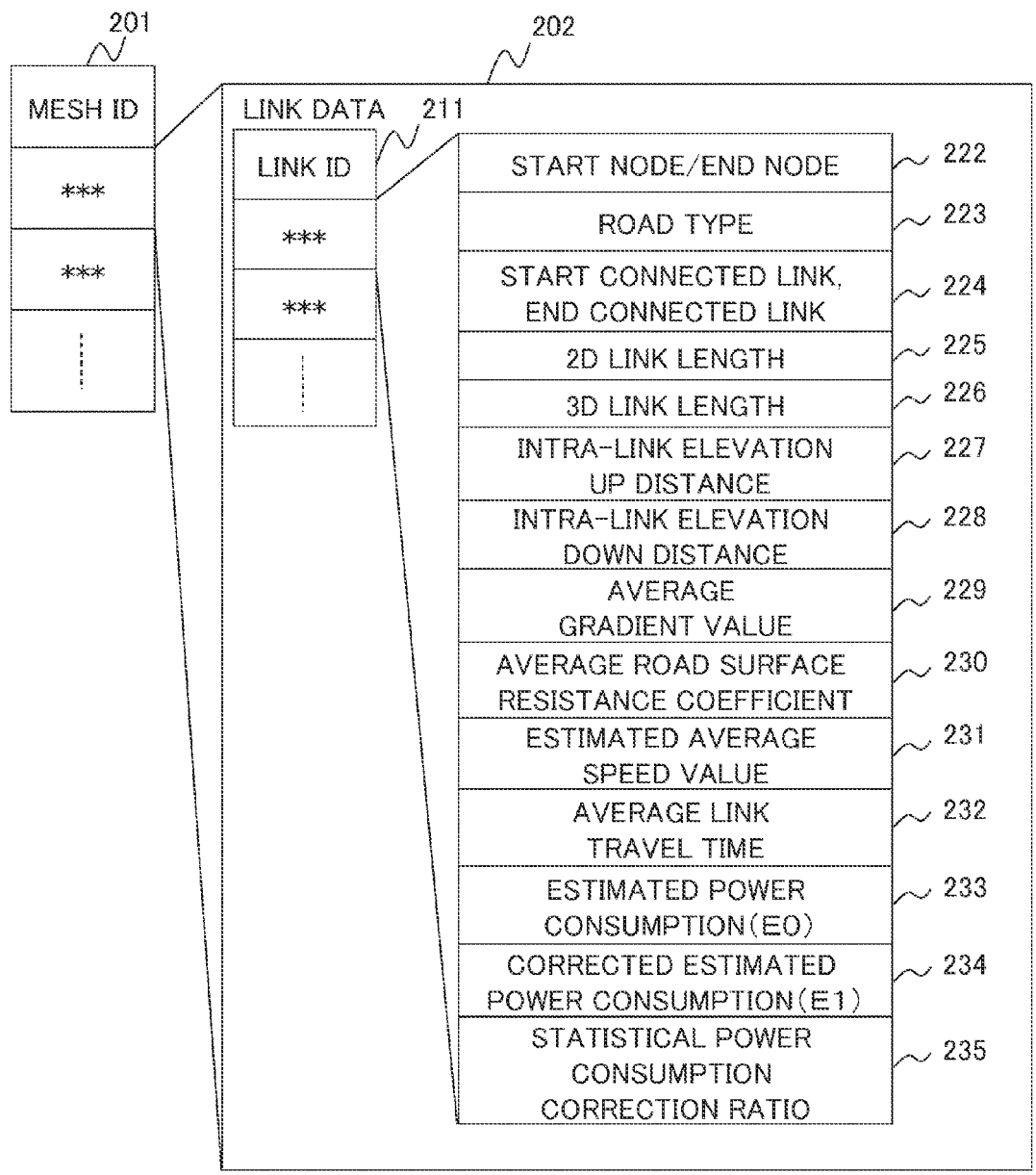
FIG. 11 is a diagram illustrating a configuration of a modified example of the link table.

Moreover, as illustrated in FIG. 11, a statistical power consumption correction ratio 235 which is a value of a correction ratio for correcting statistically processed power consumption is added as data for each of the link IDs 211 to the link table 200 according to the first embodiment.

The statistical power consumption correction ratio 235 stores a power correction ratio received via the wireless communication device from an information center or the like (not shown) connected to the network.

Figure 12:
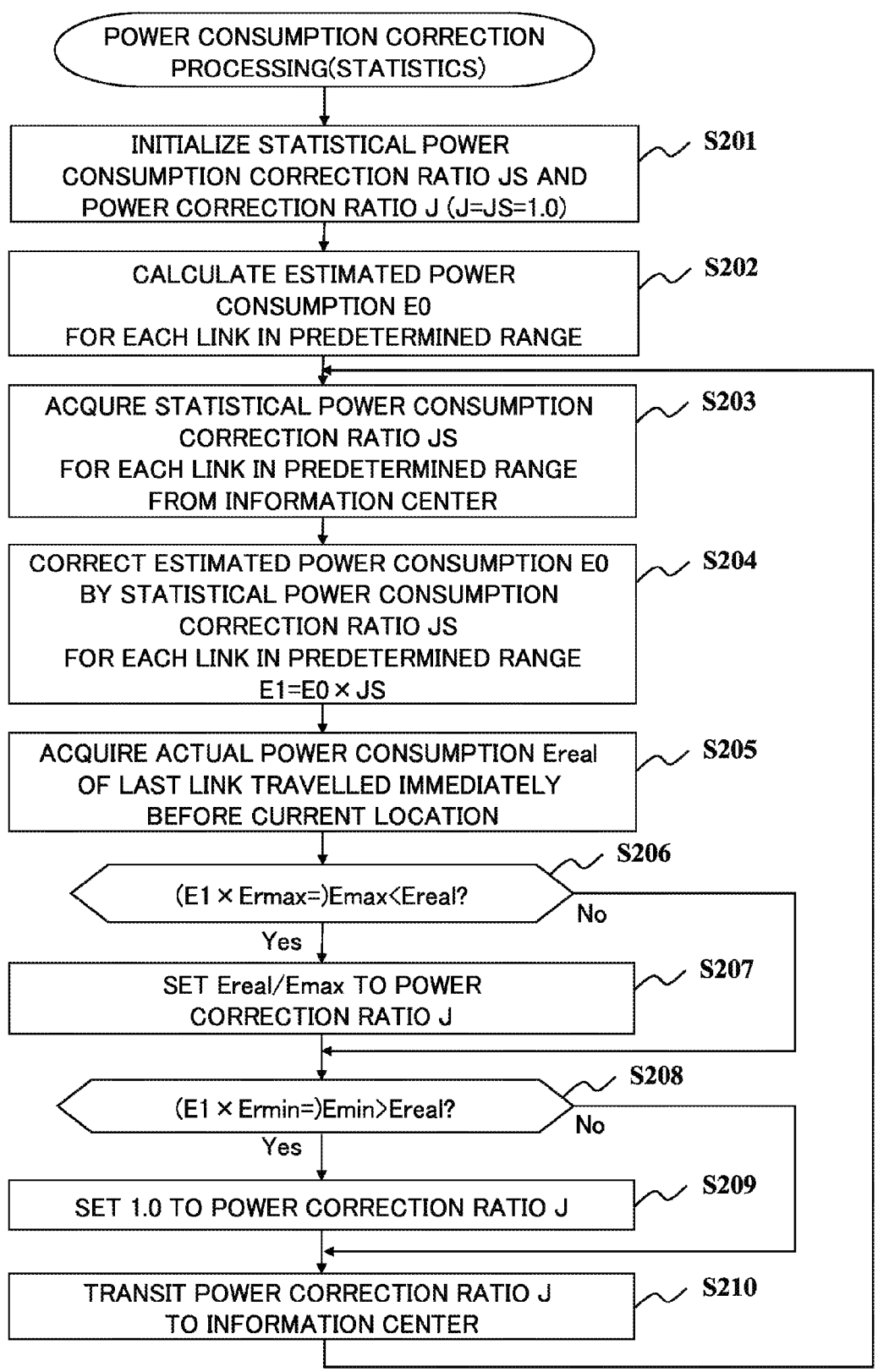
FIG. 12 is a flowchart illustrating a modified example of the power consumption correction processing.

FIG. 12 is a flowchart illustrating the power consumption correction processing according to the second embodiment. This flow is started when the navigation device 100 starts the operation.

First, the power correction value identification part 107 initializes a statistical power consumption correction ratio JS and the power correction ratio J (Step S201). Specifically, the power correction value identification part 107 sets "1.0" to the value of the statistical power consumption correction ratio JS used as the statistical power consumption correction ratio JS for each link and to the value of the power correction ratio J used as the power correction ratio. Note that, the statistical power consumption correction ratio JS is assumed to have a data structure such as an array or a table including the statistical power consumption correction ratio for each link.

Then, the link estimated power calculation part 104 calculates the estimated power consumption E0 for each of links in a predetermined range (Step S202). This processing is the same as the processing of Step S002 of the power consumption correction processing according to the first embodiment. Therefore, for each of the links identified by the acquired link IDs, the estimated power consumption E0 is calculated by the above-mentioned calculation, and is stored in the estimated power consumption (E0) 233 in the link table 200'.

Then, the link estimated power correction part 105 acquires the value of the statistical power consumption correction ratio JS from the information center (not shown) connected to a network such as the Internet for each of the links in the predetermined range (Step S203). Specifically, the link estimated power correction part 105 requests and acquires, from the information center, the value of the statistical power consumption correction ratio JS for the subject link for which the estimated power consumption E0 is calculated in Step S202. Then, the link estimated power correction part 105 stores values of ratios of the statistical power consumption correction ratio JS corresponding to the respective links in the statistical power consumption ratio 235 in the link table 200'.

Then, the link estimated power correction part 105 corrects the estimated power consumption E0 by using the statistical power consumption correction ratio JS for each of the links in the predetermined range to calculate the corrected estimated power consumption E1 (Step S204). Specifically, the link estimated power correction part 105 multiplies, for each of the links identified by the link IDs identified in Step S202, the estimated power consumption E0 by the value of the statistical power consumption correction ratio JS for the link to calculate the corrected estimated power consumption E1. Then, the link estimated power correction part 105 stores the calculated E1 of each of the links in the corrected estimated power consumption (E1) 234 in the link table 200'.

Then, the actual power consumption identification part 106 acquires information for identifying the actual power consumption Ereal of the last link travelled immediately before the current location (Step S205). This processing is the same as the processing of Step S002 of the power consumption correction processing according to the first embodiment. Therefore, the value of the actual power consumption (Ereal) 504 for identifying the accumulated amount of the power actually consumed on the link travelled immediately before is acquired.

Then, the power correction value identification part 107 determines whether or not the acquired information on Ereal exceeds the value of Emax which is a value acquired by reflecting the maximum error rate of the estimated power consumption (Step S206). Specifically, the power correction value identification part 107 compares the value of Ereal, which is the actual power consumption of the link travelled immediately before and acquired in Step S205, and the value of Emax, which is calculated by multiplying the value of the corrected estimated power consumption E1 calculated for the link by a predetermined maximum error rate (such as 120%), and determines whether or not the value of Ereal exceeds the value of Emax. When the value of Ereal does not exceed the value of Emax, that is, when the value of Ereal is equal to or less than the value of Emax, the power correction value identification part 107 causes the control to proceed to Step S208 described below.

When the value of Ereal exceeds the value of Emax ("Yes" in Step S206), the power correction value identification part 107 sets a value acquired by dividing Ereal by Emax to the power correction ratio J (Step S207).

Then, the power correction value identification part 107 determines whether or not the acquired information on Ereal falls below the value of Emin which is a value acquired by reflecting the minimum error rate of the estimated power consumption (Step S208). Specifically, the power correction value identification part 107 compares the value of Ereal, which is the actual power consumption of the link travelled immediately before and acquired in Step S205, and the value of Emin, which is calculated by multiplying the value of the corrected estimated power consumption E1 calculated for the link by a predetermined minimum error rate (such as 80%), and determines whether or not the value of Ereal falls below the value of Emin. When the value of Ereal does not fall below the value of Emin, that is, when the value of Ereal is equal to or more than the value of Emin, the power correction value identification part 107 causes the control to proceed to Step S210 described below.

When the value of Ereal falls below the value of Emin ("Yes" in Step S208), the power correction value identification part 107 sets "1.0" to the power correction ratio J (Step S209). Then, the power correction value identification part 107 causes the control to proceed to Step S210 described below.

Then, the power correction value identification part 107 transmits the value of the power correction ratio J to the information center in association with the link ID for identifying the link travelled immediately before (Step S210). Note that, when the value of the power correction ratio J deviates from a predetermined range (for example, the power correction ratio J is not included in a range between predetermined lower limit value and upper limit value), in this processing, the power correction value identification part 107 may round the value of the power correction ratio J to the lower limit value or the upper limit value, and may transmit the rounded value to the information center. Then, the power correction value identification part 107 returns the processing to Step S203.

Note that, the value of the power correction ratio J transmitted to the information center is subjected to statistical processing by an arithmetic device or the like included in the information center in a manner that the value is combined with values of the power correction ratio transmitted from the navigation devices 100 installed on other vehicles for each of the corresponding links, and the resultant is integrated into the statistical power consumption correction ratio JS.

A description has been given of the processing flow of the power consumption correction processing according to the second embodiment. The power consumption correction processing according to the second embodiment can change the correction ratio used for subsequent power consumption estimation based on the difference between the estimated power consumption for the link travelled immediately before and the actually consumed power consumption including the statistically processed information on other navigation devices. As a result, it is considered that more accurate estimation can be carried out in a manner that, for example, the actually measured values provided by vehicles already traveling on a link toward which the own vehicle is traveling are reflected to the correction value.

Note that, the estimated power consumption is corrected based on the power correction ratio in the second embodiment, but the correction is not limited to this case. In other words, the estimated power consumption may be corrected based on the power correction value as in the first embodiment, or the power correction value may be adjusted by the ratio depending on the distance of the link and be used for the correction as in the modified example of the first embodiment. In this way, more accurate estimation can be carried out.

Figure 14:
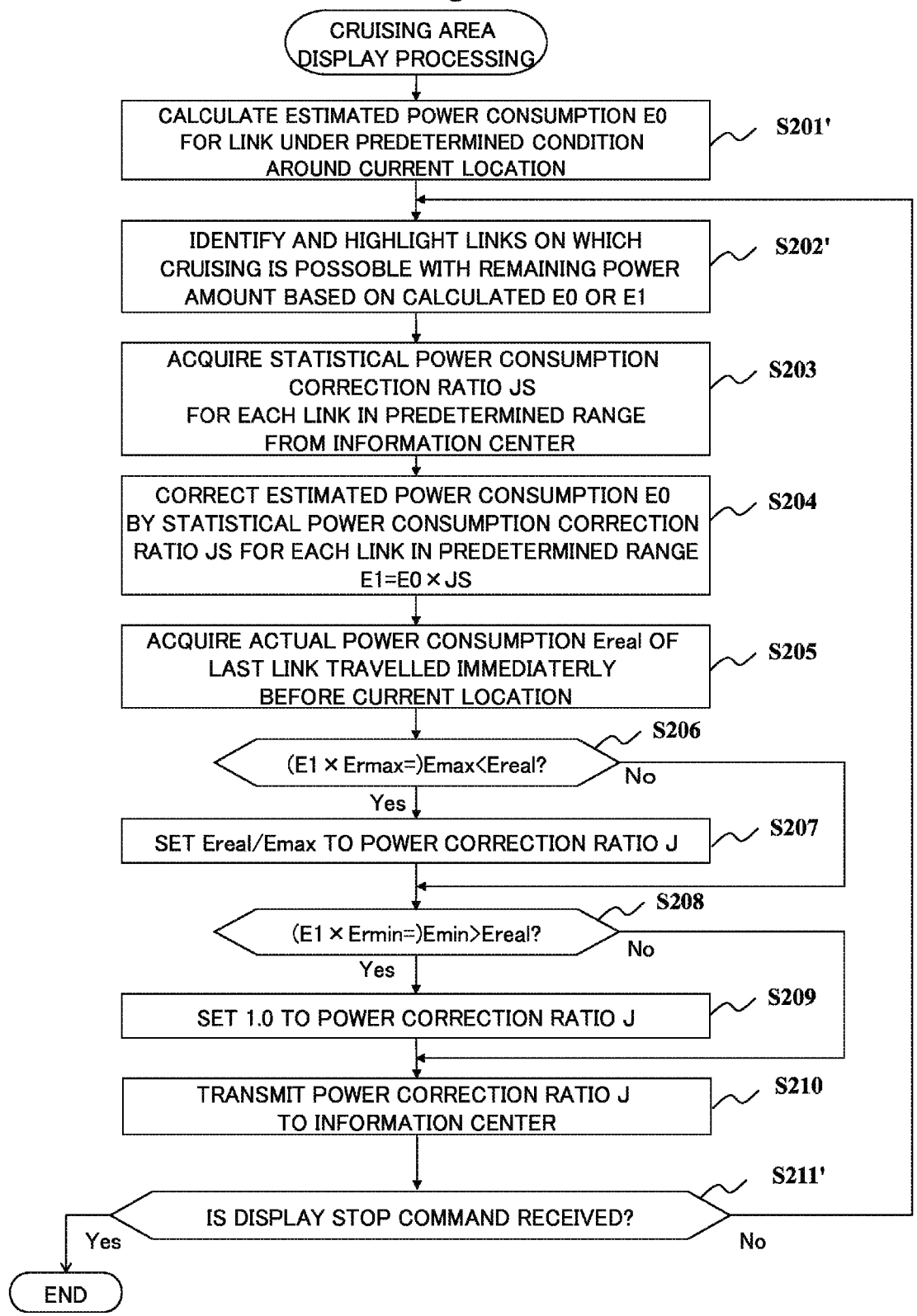
FIG. 14 is a flowchart illustrating cruising area display processing.
Figure 15:
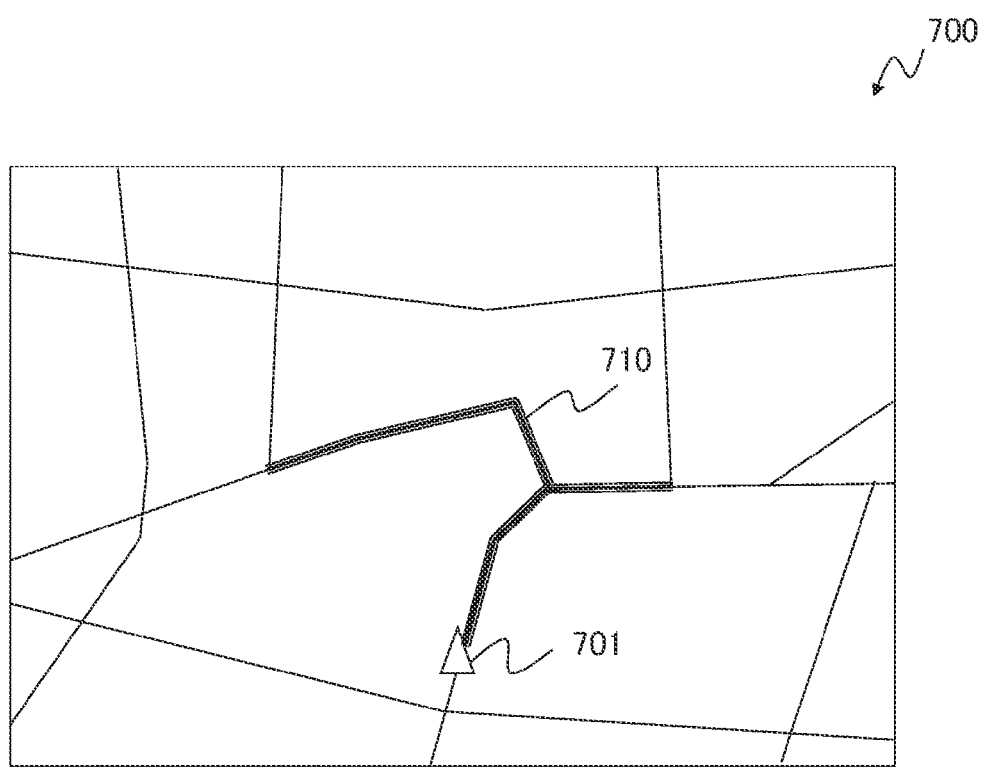
FIG. 15 is a diagram illustrating a display example of a cruising area.

FIGS. 14 and 15 are diagrams illustrating a processing flowchart and a screen display example for such a case where the above-mentioned embodiment is realized as a specific application function (function used intentionally by the user).

FIG. 14 illustrates a processing flow of cruising area display processing as the application function based on the correction of the estimated power consumption according to the second embodiment. A description is given of the processing flow, but the processing flow is basically the same as the processing according to the second embodiment, and hence a description is mainly given of the difference. Note that, the cruising area display processing refers to processing of realizing a function of displaying the possible travel area with the remaining power on the map in a superimposed manner, and is started when a predetermined function start command directed to the navigation device 100 is received.

First, the link estimated power calculation part 104 calculates the estimated power consumption E0 for a link under a predetermined condition (Step S201'). The processing includes approximately the same processing as in Steps S201 and S202 of the correction processing for the estimated power consumption according to the second embodiment. However, the processing is different from the second embodiment in such a point that subject links for which E0 is calculated are restricted by, for example, targeting links within a predetermined distance from the current location, targeting links in a predetermined direction based on the current location and the direction of the vehicle, targeting links restricted to predetermined road types (such as expressway, national roads, prefectural roads, or the like), targeting links restricted to a predetermined layer if the map data is detailed by using a plurality of layers (such as a layer only including major roads, a detailed layer including detailed roads, and the like), or targeting a combination thereof.

Then, the link estimated power calculation part 104 calculates the estimated power consumption E0 for each link under a predetermined condition. This processing is the same as the processing of Step S002 of the power consumption correction processing according to the first embodiment. Therefore, for each of the links identified by the identified link IDs, the estimated power consumption E0 is calculated by the above-mentioned calculation, and is stored in the estimated power consumption (E0) 233 in the link table 200'.

Then, the base control part 101 identifies links on which the cruising is possible with the remaining power amount by using the calculated estimated power consumption E0, and highlights the links on the map data (Step S202'). On this occasion, the base control part 101 does not use the calculated estimated power consumption E0, but uses, if E1 acquired by correcting E0 based on the statistical power consumption correction ratio JS calculated in Step S204 exists, the value of E1 by priority. Note that, for the link on which the cruising is possible, similarly to the search for route to the link, the value of the estimated power consumption E0 or E1 of the link is treated as a power amount consumed by the link travel, and a path is searched for so as to minimize the power consumption amount, and it is determined whether or not the link can be reached.

Subsequently, in Steps S203 to S210, the same processing as in Steps S203 to S210 of the correction processing of the estimated power consumption according to the second embodiment is carried out.

After the processing of S210, the base control part 101 determines whether or not a display stop command is received (Step S211'). Specifically, the base control part 101 determines whether or not an end command for the processing of realizing the function of displaying the possible travel area with the remaining power on the map in a superimposed manner (such as pressing of a function end button) is received from the user to the navigation device 100.

When the end command is received ("Yes" in Step S211'), the base control part 101 finishes the cruising area display processing.

When the end command is not received ("No" in Step S211'), the base control part 101 returns the control to Step S202'. In other words, the links on which the cruising is possible are highlighted by using the corrected E1 and the like.

A description has been given of the cruising area display processing. The processing can display the area that can be reached with the remaining power on the map in a superimposed manner by using the value of the corrected E1.

FIG. 15 is a diagram illustrating a display screen example 700 of the map displayed in the cruising area display processing. In the screen example 700, a current location 701 is displayed on the map, and a link 710 which can be reached by the remaining power is highlighted by displaying the link by three thick lines. Note that, the highlighting is simply an example, and another method such as blinking display of carrying out blinking at a predetermined time interval or color display of displaying the link in a color different from other links may be used.

A description has been given of a specific application example of the second embodiment with reference to FIGS. 14 and 15. According to the application example, for the corrected E1, a new E1 is acquired as a result of change in the degree of correction, and, as a result, the display of the area which can be reached is changed and displayed. Therefore, it is considered that a highly accurate area which can be reached is displayed.

Note that, in the above-mentioned embodiments, the value of the estimated power consumption E0 is calculated in the flow of the power consumption correction processing, but the timing of the calculation is not limited to this case, and the value may be calculated when the map information is updated, for example. In this way, a calculation load relating to the calculation of the estimated power consumption E0 can be distributed, and the present invention is thus easily realized in such a cost performance oriented hardware configuration that calculation performance is restricted.

Further, all or a part of the respective inventive technologies described as the first and second embodiments and the modified example thereof may be combined.

A description has been given of the present invention based on the embodiments.

In the respective embodiments, a description has been given of the examples where the present invention is applied to the in-vehicle navigation device for an electric vehicle, but the present invention is not limited to the in-vehicle navigation device for an electric vehicle. The present invention can be applied to an entire range of devices for calculating the energy consumption such as a navigation device used for a fuel cell vehicle and a navigation device of various types of mobile entity.

REFERENCE SIGNS LIST

1 . . . calculation processing part, 2 . . . display, 3 . . . storage device, 4 . . . speech input/output device, 5 . . . input device, 6 . . . ROM device, 7 . . . vehicle speed sensor, 8 . . . gyro sensor, 9 . . . GPS receiving device, 10 . . . FM multiplex broadcast receiving device, 11 . . . beacon receiving device, 12 . . . communication device, 21 . . . CPU, 22 . . . RAM, 23 . . . ROM, 24 . . . I/F, 25 . . . bus, 30 . . . network, 31 . . . battery power monitoring unit, 41 . . . microphone, 42 . . . speaker, 51 . . . touch panel, 52 . . . dial switch, 100 . . . navigation device, 101 . . . base control part, 102 . . . input reception part, 103 . . . output processing part, 104 . . . link estimated power calculation part, 105 . . . link estimated power correction part, 106 . . . actual power consumption identification part, 107 . . . power correction value identification part, 200 . . . link table, 300 . . . vehicle information table, 400 . . . physical information table, 500 . . . travel history table, 600 . . . screen example

The invention claimed is:

1. An energy consumption calculation device, comprising:
an energy consumption estimation unit configured to estimate an energy consumption in a predetermined section of a road;
an actual energy consumption identification unit configured to identify an actual energy consumption that is actually supplied in the predetermined section of the road by an energy supply unit adapted to supply energy;
an energy consumption correction unit configured to correct the energy consumption in the predetermined section of the road estimated by the energy consumption estimation unit in accordance with a difference between the energy consumption in the predetermined section of the road estimated by the energy consumption estimation unit and the actual energy consumption in the predetermined section of the road identified by the actual energy consumption identification unit; and
a display unit configured to identify and display, by using the energy consumption in the predetermined section of the road corrected by the energy consumption correction unit, a possible travel range of a vehicle by which travel is possible with a suppliable energy amount of the energy supply unit.

2. The energy consumption calculation device according to claim 1, wherein the energy consumption correction unit corrects, when the difference between the estimated energy consumption and the actual energy consumption is equal to or more than a predetermined threshold, the energy consumption in the predetermined section of the road estimated by the energy consumption estimation unit.

3. The energy consumption calculation device according to claim 1, wherein the energy consumption correction unit corrects, when the actual energy consumption is more than the estimated energy consumption by a predetermined threshold, the energy consumption in the predetermined section of the road estimated by the energy consumption estimation unit.

4. The energy consumption calculation device according to claim 1, wherein the energy consumption correction unit identifies a difference between an amount acquired by reflecting a predetermined permissible maximum error rate to the energy consumption in the predetermined section of the road estimated by the energy consumption estimation unit and the actual energy consumption in the predetermined section of the road identified by the actual energy consumption identification unit as a correction amount, and adds the correction amount to the energy consumption in the predetermined section of the road estimated by the energy consumption estimation unit.

5. The energy consumption calculation device according to claim 1, further comprising statistical correction amount acquisition unit adapted to acquire an energy consumption correction amount that is statistically processed in the predetermined section via a network from an external center,
wherein the energy consumption correction unit corrects, by using the statistically processed energy consumption correction amount, the energy consumption in the predetermined section of the road estimated by the energy consumption estimation unit.

6. The energy consumption calculation device according to claim 5, further comprising an energy consumption correction amount transmission unit configured to calculate an energy consumption correction amount in accordance with the difference between the estimated energy consumption and the actual energy consumption, and to transmit the calculated energy consumption correction amount to the external center via the network.

7. The energy consumption calculation device according to claim 1, further comprising a path guidance unit configured to provide guidance for a predetermined recommended path,
wherein the predetermined section of the road comprises a predetermined section of the road constructing the predetermined recommended path.

8. The energy consumption calculation device according to claim 1, further comprising a storage unit configured to store information on the vehicle and information on a configuration of the road in advance,
wherein the energy consumption estimation unit estimates the energy consumption in the predetermined section of the road by using the information on the vehicle and the information on the configuration of the road.

9. An energy consumption calculation method for use in an energy consumption calculation device, the method comprising:
estimating, by a processor, an energy consumption in a predetermined section of a road;
identifying, by the processor, an actual energy consumption that is actually supplied in the predetermined section of the road by an energy supply unit configured to supply energy;
correcting, by the processor, the energy consumption in the predetermined section of the road estimated in the estimating step in accordance with a difference between the energy consumption in the predetermined section of the road estimated in the estimating step and the actual energy consumption in the predetermined section of the road identified in the identifying step; and
identifying and displaying, on a display, by the processor, using the energy consumption in the predetermined section of the road corrected in the correcting step, a possible travel range of a vehicle by which travel is possible with a suppliable energy amount of the energy supply unit.

* * * * *